(12) United States Patent
Lablans

(10) Patent No.: US 7,365,576 B2
(45) Date of Patent: Apr. 29, 2008

(54) BINARY DIGITAL LATCHES NOT USING ONLY NAND OR NOR CIRCUITS

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 55 days.

(21) Appl. No.: 11/448,404

(22) Filed: Jun. 7, 2006

(65) Prior Publication Data

US 2006/0282607 A1   Dec. 14, 2006

Related U.S. Application Data

(60) Provisional application No. 60/688,996, filed on Jun. 9, 2005.

(51) Int. Cl.
*H03K 19/20* (2006.01)
(52) U.S. Cl. ............... 326/104; 326/112; 326/119; 326/121; 326/113
(58) Field of Classification Search ............... 326/104, 326/112–113, 119, 121
See application file for complete search history.

(56) References Cited

U.S. PATENT DOCUMENTS

| | | | |
|---|---|---|---|
| 3,250,921 A * | 5/1966 | Brette | ............ 327/222 |
| 4,280,069 A | 7/1981 | Kompelien | |
| 4,521,695 A | 6/1985 | Mazin et al. | |
| 4,695,743 A * | 9/1987 | Des Brisay, Jr. | ............ 327/203 |
| 4,964,687 A | 10/1990 | Falk | |
| 5,281,805 A | 1/1994 | Sauer | |
| 5,781,052 A | 7/1998 | Kleine | |
| 5,821,588 A | 10/1998 | Ohmae | |
| 5,861,762 A * | 1/1999 | Sutherland | ............ 326/55 |
| 6,348,824 B1 | 2/2002 | Grondalski et al. | |
| 6,456,527 B1 | 9/2002 | Campardo et al. | |
| 6,522,802 B2 | 2/2003 | Hoen | |
| 6,542,268 B1 | 4/2003 | Rotolo et al. | |
| 6,593,777 B2 | 7/2003 | Alofs | |

OTHER PUBLICATIONS

Y.-D. Wu, "New all-optical switch based on the spatial soliton repulsion," Opt. Express 14, 4005-4012 (2006), USA, no month.

* cited by examiner

*Primary Examiner*—Anh Q. Tran
(74) *Attorney, Agent, or Firm*—Glen M. Diehl; Diehl Servilla LLC

(57) ABSTRACT

A switching model to create stable binary sequential devices comprised of one or more logic functions with feedback of which an output signal is uniquely related to an input signal is applied to possible binary logic functions. Static latches of commutative and non-commutative binary functions are designed by using the switching model. Latches can be realized by individually controlled gates sometimes with inverters. Optical and electro-optical latches are disclosed. The application of transmission gates to realize latches is also disclosed.

20 Claims, 15 Drawing Sheets

|    | a |   |   |
|----|---|---|---|
| B2 | 0 | 1 |   |
| b  | 0 | 0 | 0 |
|    | 1 | 1 | 0 |
FIG. 23
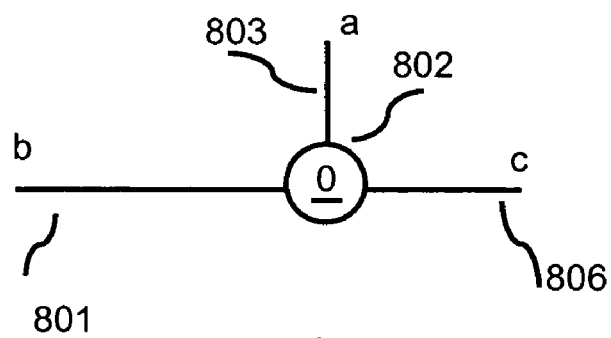
FIG. 24
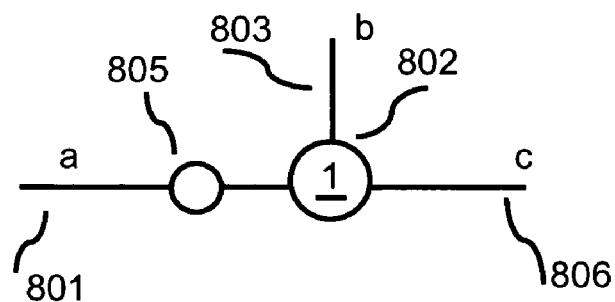
FIG. 25

US 7,365,576 B2

BINARY DIGITAL LATCHES NOT USING ONLY NAND OR NOR CIRCUITS

CROSS-REFERENCE TO RELATED APPLICATIONS

This application claims the benefit of U.S. Provisional Application No. 60/688,996, filed Jun. 9, 2005, which is incorporated herein by reference.

BACKGROUND OF THE INVENTION

This invention relates to the retention of digital information in logic devices which can be applied digital memory elements. More specifically it relates to applying binary logical functions and their configurations to achieve digital information retaining effects.

Latches are well known digital memory devices. They are binary circuits applying feedback (which is also called cross-connection) and usually apply one of two classes of binary functions: the NAND and the NOR function. These sequential devices are generally called static latches and are important memory components and building blocks for flip-flop memories for instance. The NAND and NOR functions are commutative logic functions. Non-commutative binary function based static latches broaden the availability of available static latch solutions with potentially faster or less complicated devices. Consequently, apparatus and methods to realize non-commutative binary latches are required.

SUMMARY OF THE INVENTION

In view of the more limited possibilities of the prior art in creating binary sequential devices, the current invention offers a broadening of the design and creation of memory and sequential devices by using non-commutative binary logic functions.

The general purpose of the present invention, which will be described subsequently in greater detail, is to provide novel binary latches, which can be applied in binary information retaining applications, including memory elements such as flip-flops. Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. The described information retaining devices are enabled by any switching mechanism that realizes the truth tables that are part of the invention. These switching mechanisms can be electronic, optical, electro-optical, mechanical, quantum-mechanical, molecular or of any other physical switching nature. Also, it is to be understood that the phraseology and terminology employed herein are for the purpose of the description and should not be regarded as limiting.

Binary in the context of this application means 2-valued representing 2 different states. Binary logic functions are assumed to have two inputs and one output each able to assume one of two states. The states are reflected in a truth table, usually presented in a 2×2 matrix form, with input values shown in an additional row on top of the matrix and one column to the left of the matrix. The realizing circuitry can be extended to additional inputs and outputs which will make the truth table multi-dimensional. Due to the commutative and associative nature of some binary logic functions some multi-input binary logic devices are often shown as being input order independent.

One object of the present invention is to provide new methods and apparatus to create binary latches different from known NAND and NOR technology.

Another object of the present invention is to create static binary latches by using non-commutative functions with feedback.

A further object of the present invention is to create static binary latches by using two different logic functions with feedback.

Another object of the present invention is to provide non-commutative sequential devices based on individually enabled gates and inverters.

A further object of the present invention is to provide optical binary latches.

Another object of the present invention is to provide electro-optical binary latches.

Another object of the present invention is to create static latches applying transmission gates.

BRIEF DESCRIPTION OF THE DRAWINGS

Various other objects, features and attendant advantages of the present invention will become fully appreciated as the same becomes better understood when considered in conjunction with the accompanying drawings, and wherein:

FIG. 23 shows the truth table for a non-commutative binary function.

FIG. 24 shows the realization of the truth table of FIG. 23 by an individually controlled gate with no inverters.

FIG. 25 shows a realization of the truth table of FIG. 23 by an individually controlled gate with an inverter.

DETAILED DESCRIPTION OF THE INVENTION

One aspect according to the present invention provides novel ways to create binary static latches by using logic functions different from NOR and NAND functions in known art.

The Related Art

Figure 1:
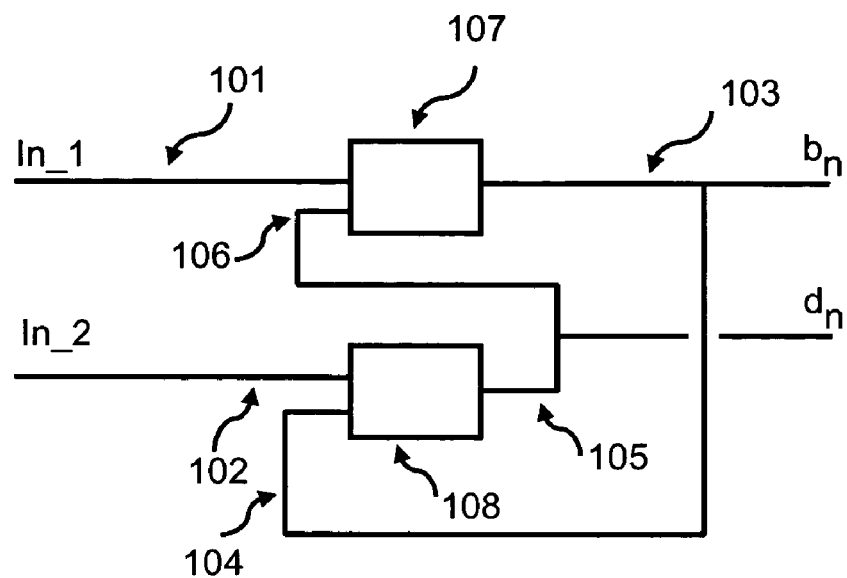
FIG. 1 is a block diagram of a digital latch comprised of two binary functions with feedback.

FIG. 1 shows a configuration of a binary latch. In this configuration the devices 107 and 108 both have one independent input and a second input which is connected with the output (103 or 105) of the other device. This cross-connection or feedback configuration creates a memory effect when devices 107 and 108 both execute a certain binary logic function. The known logic functions which will enable the latch are the binary NOR function and the binary NAND function.

Figure 2:
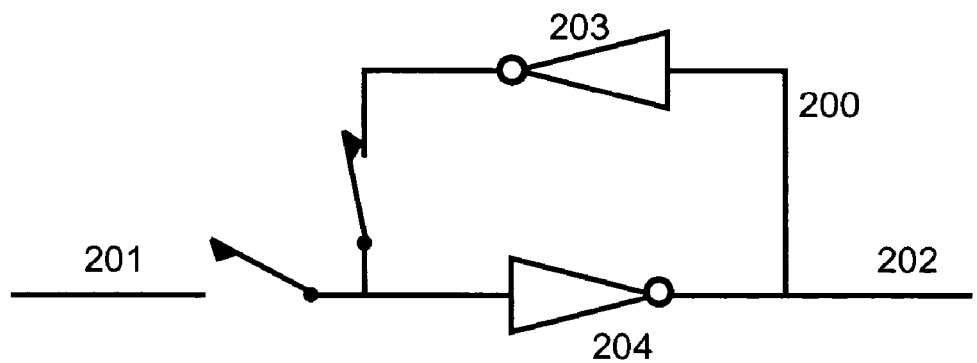
FIG. 2 shows a diagram of a latch comprised of two inverters and two individually controlled gates.
Figure 3:
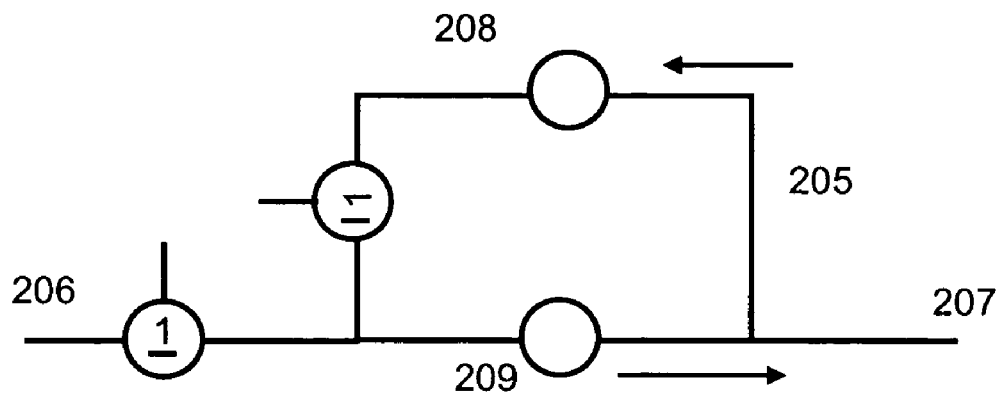
FIG. 3 shows another diagram of a latch comprised of two inverters and two individually controlled gates.

The logic diagram of FIG. 1 may not be readily recognized as static latch realizations in integrated CMOS circuitry. However the common element of the "holding" circuit in such diagrams is in general a feedback circuit of two inverters. This is shown in FIG. 2 wherein 203 and 204 are binary inverters.

N-valued inverters and gates have been applied by the inventor in other Patent Applications: U.S. Non-Provisional patent application No. Ser. 10/935,960, filed on Sep. 8, 2004, entitled TERNARY AND MULTI-VALUE DIGITAL SCRAMBLERS, DESCRAMBLERS AND SEQUENCE GENERATORS; U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS, both of which are incorporated herein by reference. To stay consistent with the approach of the cited Patent Applications the inverters and gates will be drawn as shown in FIGS. 3, 4, 5, 6 and 7. An inverter is drawn as a circle such as 208 and 209 in FIG. 3. Their operations in this circuit may be direction sensitive. The applied binary inverters in the present invention are considered to be self reversing inverters: applying these inverters twice on a binary signal will create the original signal. The symbols and elements in the drawings are intended to represent binary logic operations and are not necessarily strictly electronic circuits.

Figure 4:
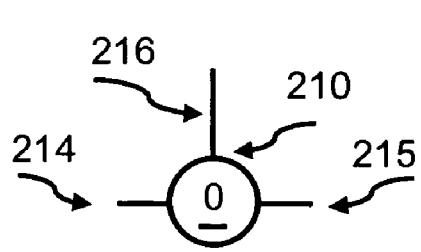
FIG. 4 is a diagram of an individually controlled gate that is conducting for control signal having state 0.

Diagrams of binary individually controlled gates are also shown in FIGS. 4, 5, 6 and 7. FIG. 4 shows the diagram of a binary individually controlled gate in further detail. The gate 210 has a control input 216 which provides a binary control signal that will determine if the gate is conducting or non-conducting. The gate has an input 214 which provides a signal to the gate and an output 215. Depending on the control signal provided by 216 the gate is conducting and the signal on output 215 is identical to the signal provided by input 214; or the gate is non-conducting and the output does not provide a signal, which in general may be considered being equal to logic state 0.

Figure 5:
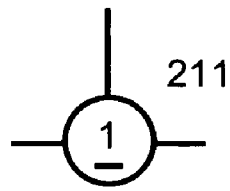
FIG. 5 is a diagram of an individually controlled gate that is conducting for control signal having state 1.

The logic operation of an individually controlled gate is indicated by designations inside the circle. For instance gate 210 of FIG. 4 shows a 0 on top of a horizontal line. This means that the gate 210 is conducting for control signal 0. Consequently gate 211 in FIG. 5 is conducting for control signal is 1 and non-conducting for all other signals (in the binary case 0).

Figure 6:
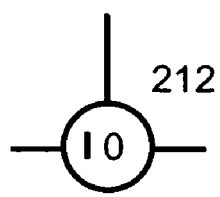
FIG. 6 is a diagram of an individually controlled gate that is conducting for control signal not having state 0.
Figure 7:
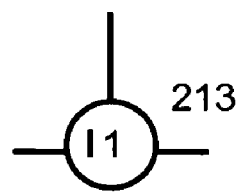
FIG. 7 is a diagram of an individually controlled gate that is conducting for control signal not having state 1.

A vertical line means the gate is non-conducting for the state indicated by the number inside the circle. Gate 212 in FIG. 6 is non-conducting for control signal is 0 and conducting for all other states of the control signal (which is 1 in the binary case). Gate 213 in FIG. 7 is non-conducting for state 1 and conducting for all other states (which is 0 in the binary case).

One should keep in mind that the diagrams of FIGS. 3, 4, 5, 6 and 7 represent logical circuits and not necessarily electronic circuits. In electronic form the "absence of signal" and disconnected output may be different states. A disconnected state of an output may create an uncertain potential or a floating node. One solution may be to force the output to ground level or make the impedance of the output infinitely large.

One embodiment of an appropriate realization of the "absence of signal" approach as a logic state is to use a switch which is an optical gate. An n-level signal may then be represented as an optical signal which can assume n different levels of intensity. An inverter modifies the inputted optical intensity according to the inverter. "Absence of signal" then means "no light" which may then represent a logical state.

One way to prevent problems with uncertainty in potential levels is to have no "absence of signal". A logical signal 0 herein is always represented by a non-zero actual signal.

The fundamentals of a latch circuit as in FIG. 1 include the following:
1. At least 2 combinations of binary input signals to a 2-input latch circuit will create a combination of stable and consistent output signals to the 2 outputs, independent of the initial conditions of the circuit.

2. Each combination of stable output signals is uniquely related to a combination of input signals and forms the initial conditions for the next status of a latch circuit.
3. When the input signals are changed to a third combination, depending on its initial condition the latching circuit will maintain its previous output combination.

This behavior of a latch circuit is considered to be attractive because it works as a memory device. The downside is that there are usually undesirable, unstable states depending on inputs and initial conditions. The initial conditions leading to these undesirable states are usually called "forbidden" or "invalid" states.

Usually measures will be taken to prevent actual circuits from going into these "forbidden" states.

The Switching Model

Figure 8:
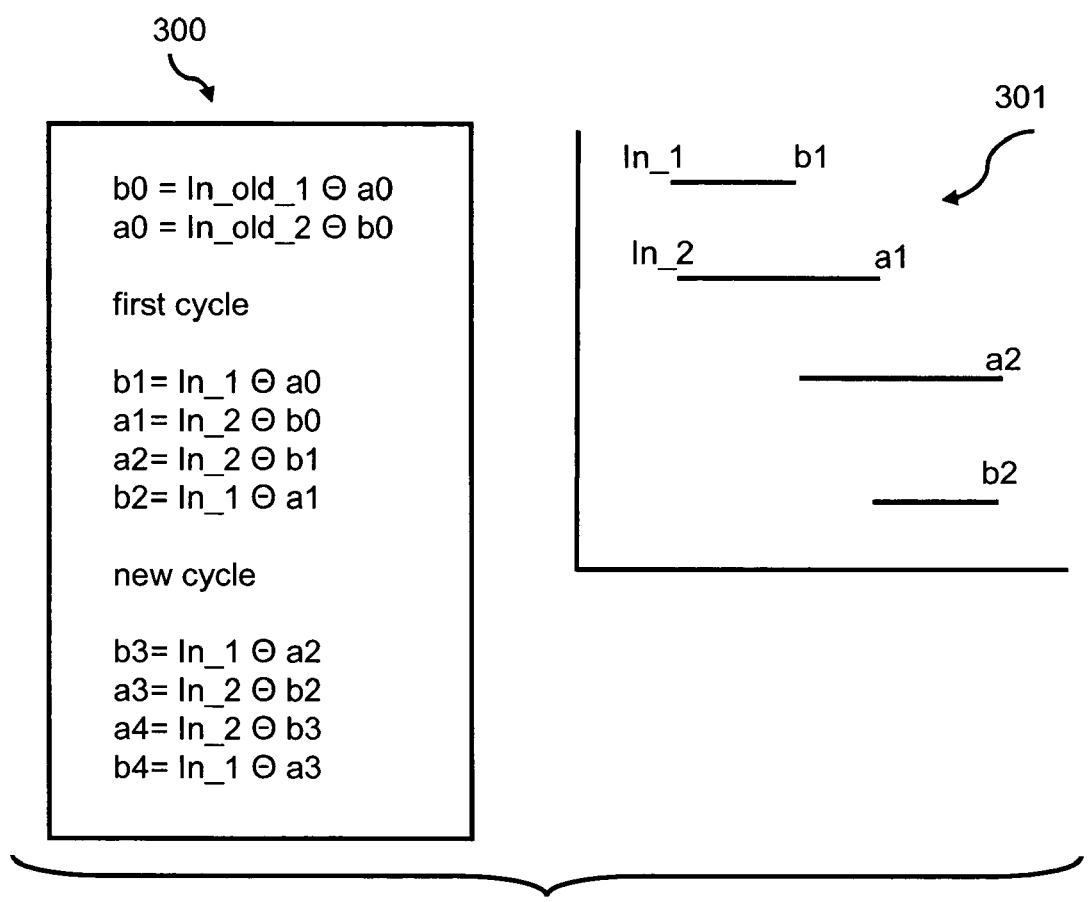
FIG. 8 shows a switching model for the device shown in the diagram FIG. 1.

It is often difficult to visualize the performance of a two device latch with feedback on a strict logic basis. To assist with analyzing the behavior of these devices the inventor has created a switching model. This switching model is explained by the inventor in U.S. Non-Provisional patent application Ser. No. 11/139,835 filed May 27, 2005, entitled MULTI-VALUED DIGITAL INFORMATION RETAINING ELEMENTS AND MEMORY DEVICES and incorporated herein by reference. The switching model for binary realization of the configuration of FIG. 1 is shown in FIG. 8. FIG. 1 is a generic configuration of the latch with two independent inputs 101 and 102 and binary logic devices 107 and 108. Its switching behavior is shown symbolically in table 300 and in timelines in graph 301 of FIG. 8. It is assumed that the circuit is in a stable situation with signal In_1_old provided on input 101 and In_2_old provided on 102 in the latch of FIG. 1. A signal b0 will be generated on output 103 according to b0=(In_1_old θ a0). And a signal a0 will be generated on output 105 according to a0=(In_2_old θ b0). The symbol θ indicates the binary logic function that is executed. It should be clear that this model holds for any logic function and does not depend on the actual function.

Assume the signal provided by 101 is changed to In_1 and the signal provided by 102 is changed to In_2. There is a finite time required for devices 107 and 108 to complete the generation of a new output value as the result of a new input value. Consequently, during a finite period, the devices still see the old initial values a0 and b0 on the inputs 104 and 106. The devices will first generate a new output as a result of the new input values and the initial condition, followed by the result of the new input value and the newly generated output values. Because the switching is causal (a new result can not be generated before a new input signal is available) one output result can not "surpass" the other one in speed, and after two switching cycles (also called a complete cycle) a complete cycle starts again. One may then conclude that when two consecutive results on an output are identical the device has achieved stability. So when b3−b2≠0 and a3−a2≠0 and b4−b3=0 and a4−a3=0 then the configuration of FIG. 1 achieved stability after the third switching cycle (or 1½ complete cycle). In general the stability condition achieved in switching cycle (n−1) is in formula: $b_n=b_{n-1}$ and $a_n=a_{n-1}$.

In practice it would be difficult to change the signals on 101 and 102 at exactly the same time. For that reason it is preferable that just one of the input signals is required to change at a certain time while the other remains the same. The only time where this restriction is not required is when a combination of input signals will generate a stable and unique combination of output signals, no matter what the initial conditions are.

There are conditions in the switching model of FIG. 8 related to the configuration of FIG. 1 to make the device of FIG. 1 work as a binary latch. The first condition is that a signal provided by at least one of the outputs of the configuration has to be uniquely related to an input signal. The second condition is that each function realized in a device has a finite switching time. A third condition is that the output signal has to be stable after a finite time. Further more a latch configuration has to be stable and correct for its initial conditions. A certain settling time is allowed and will be expressed in switching cycles.

Validation of the Switching Model on the Binary Latch

One can apply the switching model shown in FIG. 8 to known binary functions that realizes a static latch such as the NAND function.

A switching table based on the NAND latch and applying the model of FIG. 8 is shown in the following table.

| In_1 101 | In_2 102 | b1 103 | b2 103 | b3 103 | b4 103 | a1 105 | a2 105 | a3 105 | a4 105 | b0 103 | a0 105 |
|---|---|---|---|---|---|---|---|---|---|---|---|
| 0 | 0 | 1 | 1 | 1 | 1 | 1 | 1 | 1 | 1 | 0 | 0 |
| 0 | 0 | 1 | 1 | 1 | 1 | 1 | 1 | 1 | 1 | 0 | 1 |
| 0 | 0 | 1 | 1 | 1 | 1 | 1 | 1 | 1 | 1 | 1 | 0 |
| 0 | 0 | 1 | 1 | 1 | 1 | 1 | 1 | 1 | 1 | 1 | 1 |
| 0 | 1 | 1 | 1 | 1 | 1 | 0 | 0 | 0 | 0 | 0 | 0 |
| 0 | 1 | 1 | 1 | 1 | 1 | 0 | 0 | 0 | 0 | 0 | 1 |
| 0 | 1 | 1 | 1 | 1 | 1 | 0 | 0 | 0 | 0 | 1 | 0 |
| 0 | 1 | 1 | 1 | 1 | 1 | 0 | 0 | 0 | 0 | 1 | 1 |
| 1 | 0 | 1 | 0 | 0 | 0 | 1 | 1 | 1 | 1 | 0 | 0 |
| 1 | 0 | 0 | 0 | 0 | 0 | 1 | 1 | 1 | 1 | 0 | 1 |
| 1 | 0 | 1 | 0 | 0 | 0 | 1 | 1 | 1 | 1 | 1 | 0 |
| 1 | 0 | 0 | 0 | 0 | 0 | 1 | 1 | 1 | 1 | 1 | 1 |
| 1 | 1 | 1 | 0 | 1 | 0 | 1 | 0 | 1 | 0 | 0 | 0 |
| 1 | 1 | 0 | 0 | 0 | 0 | 1 | 1 | 1 | 1 | 0 | 1 |
| 1 | 1 | 1 | 1 | 1 | 1 | 0 | 0 | 0 | 0 | 1 | 0 |
| 1 | 1 | 0 | 1 | 0 | 1 | 0 | 1 | 0 | 1 | 1 | 1 |

The top row identifies the specific signals during switching. The numerals in the top row relate to the inputs and outputs of FIG. 1. The last two columns provide the initial conditions for the circuit. All output signals are determined for 4 consecutive switching cycles for all possible input signals and all possible initial conditions.

The table shows that for input signals (In_1, In_2)=(0,1) no matter the initial condition the output signals will be (1,0). It also shows that for (In_1, In_2)=(1,0) no matter the initial condition the output will be (0,1).

When the input combination is (In_1, In_2)=(1,1) and the initial condition is (1,0) then the output signals remain (1,0). When (In_1, In_2)=(1,1) and the initial condition is (0,1) then the output signals will remain (0,1).

The switching table also shows that (0,0) is "forbidden" because it drives the output to (1,1) and when the input signal is changed to (1,1) then the circuit with (In_1, In_2)=(1,1) and initial state (1,1) will logically not achieve stability.

Other Latch Functions

One can run the switching model as shown in FIG. 8 and apply all known 16 binary (commutative and non-commutative) logic functions to the configuration of FIG. 1. The following table shows the functions (with devices 107 and 108 having identical functions) that will enable a latch.

| NOR | 0 | 1 | B2 | 0 | 1 | B3 | 0 | 1 | NAND | 0 | 1 |
|-----|---|---|----|---|---|----|---|---|------|---|---|
| 0   | 1 | 0 | 0  | 0 | 0 | 0  | 1 | 0 | 0    | 1 | 1 |
| 1   | 0 | 0 | 1  | 1 | 0 | 1  | 1 | 1 | 1    | 1 | 0 |

The NOR function and the NAND function are of course known to enable a binary latch. Binary latches formed by the non-commutative binary functions B2 and B3 are novel.

The latch with function B2 can be created from the configuration of FIG. 1 with binary functions 107 and 108 being NOR functions in which the signals inputted on 101 and 102 are inverted by an inverter. It is assumed that the top input of a device determines the row, and the bottom input the column of a device's truth table. The symbol for such a device is shown in FIG. 11. Because the function B2 is non-commutative it is important to put the inverter at the correct input. One can achieve the same function of FIG. 11 by using an AND device and putting the inverter in the bottom input, as is shown in FIG. 10. It should be realized that function B2 is a valid logic function, although it is not an often used function. Logic functions in general can be derived from each other by, what is known as a set of adequate connectives. The fact that one logic function can be created from another by applying inverters does not make the functions equivalent. This is shown by the truth table of B2, shown in FIG. 9, which is different from the truth table of the NOR function.

An issue addressed as an aspect of the present invention is to create a latch with as few (and as simple) functions as possible. One of the simplest functions, in terms of individually controlled gates, is the binary logic AND function. Its realization is a single individually controlled gate which is conducting when the control input has logic value '1'. This is shown in FIG. 5, which is identical to FIG. 6. Unfortunately the simplest configuration according to FIG. 1 with the functions AND for 107 and 108 in FIG. 1 would not create a valid information retaining latch.

Another simple realization of a function by a single individually controlled gate is the binary function B2. Its truth table is shown in the following table.

| B2 | 0 | 1 |
|----|---|---|
| 0  | 0 | 0 |
| 1  | 1 | 0 |

If input 'a' determines the columns of the truth table B2 and 'b' determines the rows of B2 and the output of B2 is 'c' then one can represent the function by: c→b>a or "b is grater than a". This is an arithmetical representation. In essence B2 represents a switching function, which does not have inherent meaning for its states. However in imagining what the function may signify one may use "b is greater than a".

Figure 9:
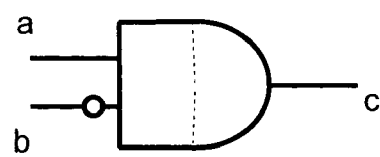
FIG. 9 shows a truth table of a non-commutative binary logic function.
Figures 10, 11:
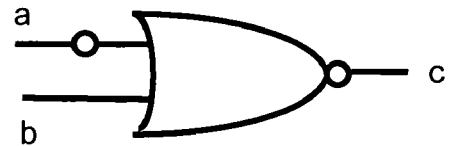
FIG. 10 shows a representation of a device realizing the truth table of FIG. 9 using an AND function and an inverter at one of its inputs.
FIG. 11 shows a representation of a device realizing the truth table of FIG. 9 using an NOR function and an inverter at one of its inputs.
Figure 12:
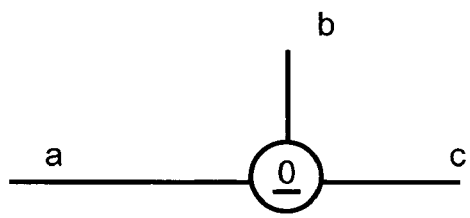
FIG. 12 shows a realization of the truth table of FIG. 9.
Figure 13:
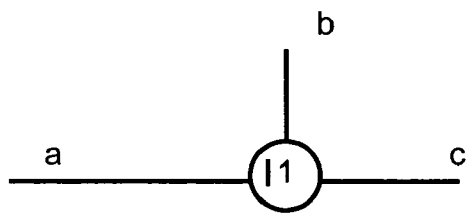
FIG. 13 shows another realization of the truth table of FIG. 9.

FIG. 12 shows a realization of the truth table B2 of FIG. 9. FIG. 13 shows another realization of the truth table B2 of FIG. 9. The novelty of the new latching solution is best demonstrated in its realization by gates and inverters as well as in its switching table.

The following table shows the switching table for a binary configuration according to the diagram of FIG. 1 with the devices 107 and 108 both executing the non-commutative binary function B2.

| In_1 | In_2 | b1  | b2  | b3  | b4  | a1  | a2  | a3  | a4  | b0  | a0  |
|------|------|-----|-----|-----|-----|-----|-----|-----|-----|-----|-----|
| 101  | 102  | 103 | 103 | 103 | 103 | 105 | 105 | 105 | 105 | 103 | 105 |
| 0    | 0    | 0   | 0   | 0   | 0   | 0   | 0   | 0   | 0   | 0   | 0   |
| 0    | 0    | 0   | 0   | 0   | 0   | 0   | 0   | 0   | 0   | 0   | 1   |
| 0    | 0    | 0   | 0   | 0   | 0   | 0   | 0   | 0   | 0   | 1   | 0   |
| 0    | 0    | 0   | 0   | 0   | 0   | 0   | 0   | 0   | 0   | 1   | 1   |
| 0    | 1    | 0   | 0   | 0   | 0   | 1   | 1   | 1   | 1   | 0   | 0   |
| 0    | 1    | 0   | 0   | 0   | 0   | 1   | 1   | 1   | 1   | 0   | 1   |
| 0    | 1    | 0   | 0   | 0   | 0   | 1   | 1   | 1   | 1   | 1   | 0   |
| 0    | 1    | 0   | 0   | 0   | 0   | 1   | 1   | 1   | 1   | 1   | 1   |
| 1    | 0    | 1   | 1   | 1   | 1   | 0   | 0   | 0   | 0   | 0   | 0   |

-continued

| In_1 101 | In_2 102 | b1 103 | b2 103 | b3 103 | b4 103 | a1 105 | a2 105 | a3 105 | a4 105 | b0 103 | a0 105 |
|---|---|---|---|---|---|---|---|---|---|---|---|
| 1 | 0 | 0 | 1 | 1 | 1 | 0 | 0 | 0 | 0 | 0 | 1 |
| 1 | 0 | 1 | 1 | 1 | 1 | 0 | 0 | 0 | 0 | 1 | 0 |
| 1 | 0 | 0 | 1 | 1 | 1 | 0 | 0 | 0 | 0 | 1 | 1 |
| 1 | 1 | 1 | 0 | 1 | 0 | 1 | 0 | 1 | 0 | 0 | 0 |
| 1 | 1 | 0 | 0 | 0 | 0 | 1 | 1 | 1 | 1 | 0 | 1 |
| 1 | 1 | 1 | 1 | 1 | 1 | 0 | 0 | 0 | 0 | 1 | 0 |
| 1 | 1 | 0 | 1 | 0 | 1 | 0 | 1 | 0 | 1 | 1 | 1 |

The switching table shows the behavior of the latch with B2 that is stable for input signals 'In_1=1' and 'In_2=1' when the initial states (b0, a0) were (0,1) and (1,0). The state (b0, a0)=(0,0) is a forbidden state. It also shows that input combination (In_1, In_2)=(0,1) always generates output signals (0,1) no matter what the initial conditions. The input combination (In_1, In_2)=(1,0) always generates output signals (1,0) no matter what the initial conditions.

Figure 14:
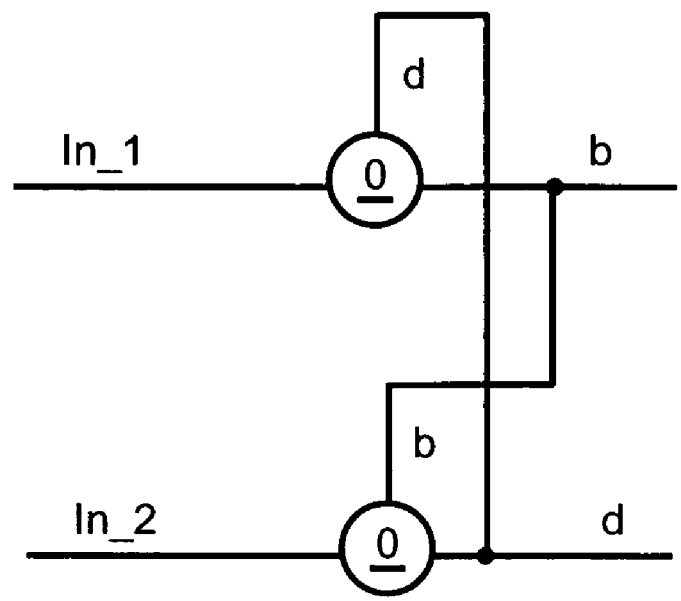
FIG. 14 shows a diagram of a static latch comprised of individually controlled gates.

The realization of the latch based on non-commutative binary logic function B2 by individually controlled gates is shown in FIG. 14. It demonstrates a highly efficient realization that would not require any inverters. This realization has as an additional advantage that the "forbidden" output state (b,d) is not catastrophic. If for some reason (b,d)=(0,0) (for instance at start-up), it makes both individually controlled gates in FIG. 14 conducting. This means that as soon inputs (In_1, In_2) become either (0,1) or (1,0) the outputs are moved out of 'forbidden' state.

Figure 15:
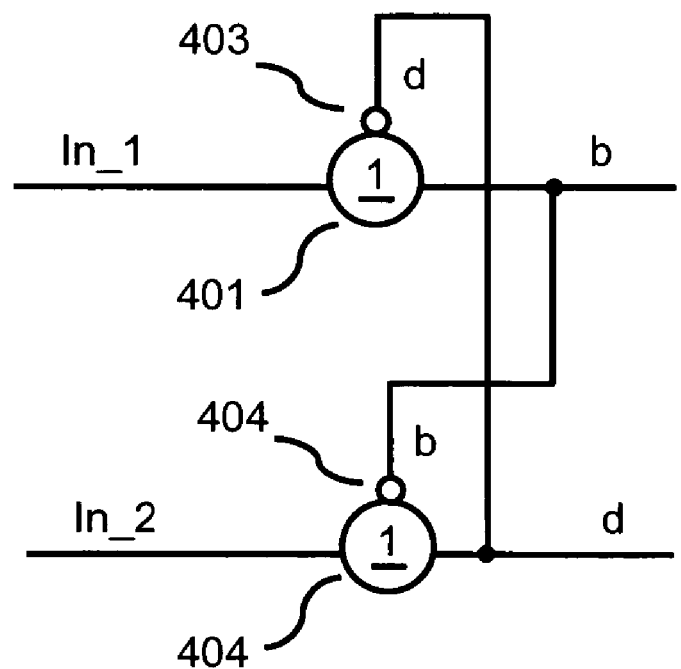
FIG. 15 shows another diagram of a static latch comprised of individually controlled gates.

The circuit of FIG. 14 can also be realized by the circuit of FIG. 15, which comprises 2 AND gates 401 and 402, or 2 individually controlled gates which are conducting when the control signal is 1, with inverters 403 and 404 to make the AND gates comply with the requirements to switch according to the B2 binary logic function.

Running the model of FIG. 8 on the configuration of FIG. 1 with the binary function provided by truth table B3 provides a binary latch that is stable for input signals 'In_1=0' and 'In_2=0' when the initial states (b0,a0) are (0,1) and (1,0). The state (b0, a0)=(1,1) is a forbidden state. Its switching table is shown in the following table. The neutral state is input (0,0) which will maintain the previous state at the output.

Other binary latches can be created and realized with identified forbidden states, using non-identical binary functions. In particular a sequential binary circuit according to the configuration of FIG. 1 with binary functions B21 and B22 will create a latch. The truth tables of B21 and B22 are provided in the following table.

| B21 | 0 | 1 | B22 | 0 | 1 |
|---|---|---|---|---|---|
| 0 | 1 | 1 | 0 | 0 | 1 |
| 1 | 0 | 1 | 1 | 0 | 0 |

Also combinations of commutative functions can be used to create a binary latch. For instance the AND and OR function applied in the configuration of FIG. 1 will create a latch. The AND and OR truth tables are shown in the following table.

| AND | 0 | 1 | OR | 0 | 1 |
|---|---|---|---|---|---|
| 0 | 0 | 0 | 0 | 0 | 1 |
| 1 | 0 | 1 | 1 | 1 | 1 |

Its switching table of that latch is provided in the following table.

| In_1 101 | In_2 102 | b1 103 | b2 103 | b3 103 | b4 103 | a1 105 | a2 105 | a3 105 | a4 105 | b0 103 | a0 105 |
|---|---|---|---|---|---|---|---|---|---|---|---|
| 0 | 0 | 1 | 0 | 1 | 0 | 1 | 0 | 1 | 0 | 0 | 0 |
| 0 | 0 | 0 | 0 | 0 | 0 | 1 | 1 | 1 | 1 | 0 | 1 |
| 0 | 0 | 1 | 1 | 1 | 1 | 0 | 0 | 0 | 0 | 1 | 0 |
| 0 | 0 | 0 | 1 | 0 | 1 | 0 | 1 | 0 | 1 | 1 | 1 |
| 0 | 1 | 1 | 0 | 0 | 0 | 1 | 1 | 1 | 1 | 0 | 0 |
| 0 | 1 | 0 | 0 | 0 | 0 | 1 | 1 | 1 | 1 | 0 | 1 |
| 0 | 1 | 1 | 0 | 0 | 0 | 1 | 1 | 1 | 1 | 1 | 0 |
| 0 | 1 | 0 | 0 | 0 | 0 | 1 | 1 | 1 | 1 | 1 | 1 |
| 1 | 0 | 1 | 1 | 1 | 1 | 1 | 0 | 0 | 0 | 0 | 0 |
| 1 | 0 | 1 | 1 | 1 | 1 | 1 | 0 | 0 | 0 | 0 | 1 |
| 1 | 0 | 1 | 1 | 1 | 1 | 0 | 0 | 0 | 0 | 1 | 0 |
| 1 | 0 | 1 | 1 | 1 | 1 | 0 | 0 | 0 | 0 | 1 | 1 |
| 1 | 1 | 1 | 1 | 1 | 1 | 1 | 1 | 1 | 0 | 0 | 0 |
| 1 | 1 | 1 | 1 | 1 | 1 | 1 | 1 | 1 | 1 | 0 | 1 |
| 1 | 1 | 1 | 1 | 1 | 1 | 1 | 1 | 1 | 1 | 1 | 0 |
| 1 | 1 | 1 | 1 | 1 | 1 | 1 | 1 | 1 | 1 | 1 | 1 |

| In_1 101 | In_2 102 | b1 103 | b2 103 | b3 103 | b4 103 | a1 105 | a2 105 | a3 105 | a4 105 | b0 103 | a0 105 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 |
| 0 | 0 | 0 | 0 | 0 | 0 | 1 | 0 | 0 | 0 | 1 | 0 |
| 0 | 0 | 0 | 0 | 0 | 0 | 1 | 0 | 0 | 0 | 1 | 1 |
| 0 | 1 | 0 | 0 | 0 | 0 | 1 | 1 | 1 | 1 | 0 | 0 |
| 0 | 1 | 0 | 0 | 0 | 0 | 1 | 1 | 1 | 1 | 0 | 1 |
| 0 | 1 | 0 | 0 | 0 | 0 | 1 | 1 | 1 | 1 | 1 | 0 |
| 0 | 1 | 0 | 0 | 0 | 0 | 1 | 1 | 1 | 1 | 1 | 1 |
| 1 | 0 | 0 | 0 | 0 | 0 | 0 | 0 | 0 | 0 | 0 | 0 |
| 1 | 0 | 1 | 0 | 1 | 0 | 0 | 1 | 0 | 1 | 0 | 1 |
| 1 | 0 | 0 | 1 | 0 | 1 | 1 | 0 | 1 | 0 | 1 | 0 |
| 1 | 0 | 1 | 1 | 1 | 1 | 1 | 1 | 1 | 1 | 1 | 1 |
| 1 | 1 | 0 | 1 | 1 | 1 | 1 | 1 | 1 | 0 | 0 | 0 |
| 1 | 1 | 1 | 1 | 1 | 1 | 1 | 1 | 1 | 1 | 0 | 1 |
| 1 | 1 | 0 | 1 | 1 | 1 | 1 | 1 | 1 | 1 | 1 | 0 |
| 1 | 1 | 1 | 1 | 1 | 1 | 1 | 1 | 1 | 1 | 1 | 1 |

Figure 16:
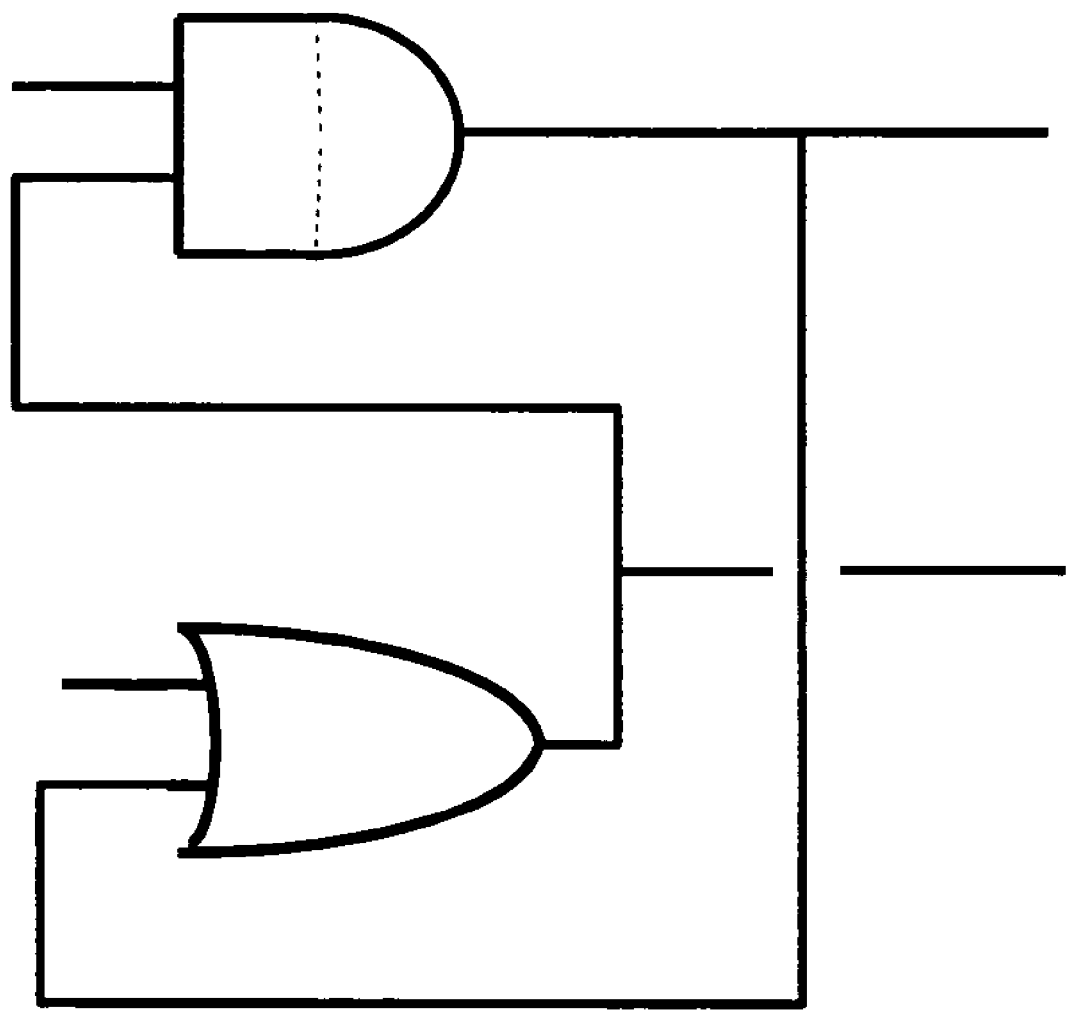
FIG. 16 shows a diagram of a latch realized by using an AND and an OR function.

The table shows that the latch is stable for: (In_1, In_2)=(1,0) with initial states (0,0) and output (0,0) as well for: (In_1, In_2)=(1,0) with initial states are (1,1) and output (1,1). For input states (In_1, In_2)=(0,0) the outputs are (0,0) for all initial states. For input states (In_1, In_2)=(1,1) the outputs are (1,1) for all initial states. The forbidden state is (In_1, In_2)=(0,1). The configuration of this latch is shown symbolically in FIG. 16. It should be clear in this (and other examples) that the positions of the devices (being a top or a bottom position) are interchangeable.

The following combinations of functions applied in the configuration of FIG. 1 will also create a latch.

| B2 | 0 | 1 | B24 | 0 | 1 |
|---|---|---|---|---|---|
| 0 | 0 | 0 | 0 | 1 | 0 |
| 1 | 1 | 0 | 1 | 0 | 0 |
| AND | 0 | 1 | B21 | 0 | 1 |
| 0 | 0 | 0 | 0 | 1 | 1 |
| 1 | 0 | 1 | 1 | 0 | 1 |
| NAND | 0 | 1 | B25 | 0 | 1 |
| 0 | 1 | 1 | 0 | 1 | 0 |
| 1 | 1 | 0 | 1 | 1 | 1 |
| B22 | 0 | 1 | B21 | 0 | 1 |
| 0 | 0 | 1 | 0 | 1 | 1 |
| 1 | 0 | 0 | 1 | 0 | 1 |
| B22 | 0 | 1 | OR | 0 | 1 |
| 0 | 0 | 1 | 0 | 0 | 1 |
| 1 | 0 | 0 | 1 | 1 | 1 |

Latch Realization with Gates and Inverters

Novel binary latch configurations which are one aspect of the present invention as shown in FIG. 1, applying identical functions for devices 107 and 108, use non-commutative binary functions. This provides new opportunities in realization of latch circuits by means of gates and inverters. Latches created from two NOR or two NAND functions apply commutative functions and are known. In that case the order of inputs to a two input device does not matter.

Figure 17:
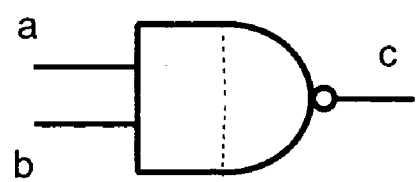
FIG. 17 shows the known symbol for a NAND function.
Figure 18:
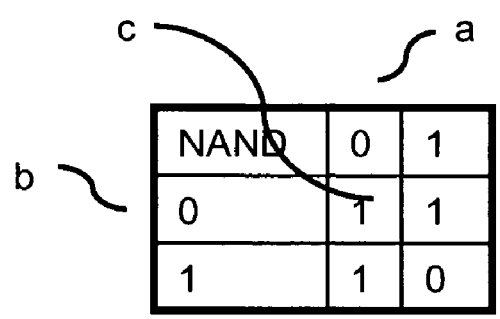
FIG. 18 shows the truth table for the NAND function.
Figure 19:
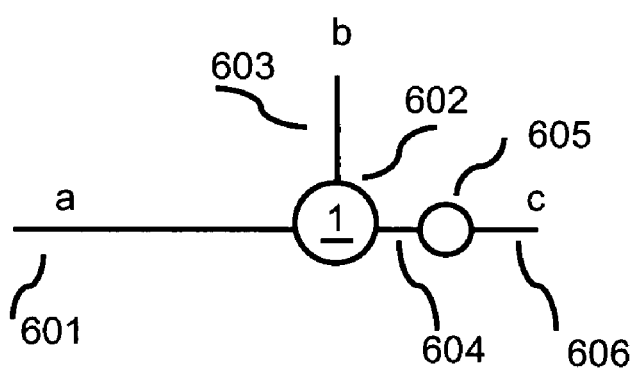
FIG. 19 shows the realizations of the NAND function by an individually controlled gate with an inverter.

FIG. 17 shows the known symbol of a binary NAND and FIG. 18 shows its truth table. The use of an individually controlled gate with an inverter to realize a NAND is shown in FIG. 19. In the truth table the output signal 'c' will assume a value determined by the column under the selected value of 'a' and in the row determined by the value of 'b'. One can rephrase that by stating that when 'a=0', then the signal 'b' 'sees' an inverter determined by the column under 'a'. In the case of the NAND it means that when 'a=0' then 'b' 'sees' an inverter (1 1), represented by the column in the truth table under 'a=0'. When 'a=1' then 'b' 'sees' the inverter (1 0) represented by the column in the truth table under 'a=1'.

Consequently the circuit realizing the NAND function can be represented by the diagram of FIG. 19. The signal 'a' provided by 6011 first 'sees' a gate 602 controlled by a signal 'b' on 603. This gate is conducting when 'b=1'. Assuming that 'absence of signal' represents state 0, when 'b=0' the gate is non-conducting and a signal 0 will be available on the gate output 604. This output is connected with an inverter 605 (1 0) changing a 0 into a 1 and a 1 into a 0. Consequently a signal 0 on 604 will be changed to a 1 by the inverter 605 and provided on output 606. So when 'b=0' then 'c=1' no matter what 'a' is. This is in accordance with the truth table. When 'b=1' the gate 602 is conducting and provides the input signal 'a' directly to inverter 605 which will invert the signal 'a' and provide it on output 606, also in accordance with the truth table of the NAND function. It does not matter if the signal 'a' and 'b' are switched. The circuit of FIG. 19 will still realize the NAND truth table. Consequently the circuit is commutative.

Figure 20:
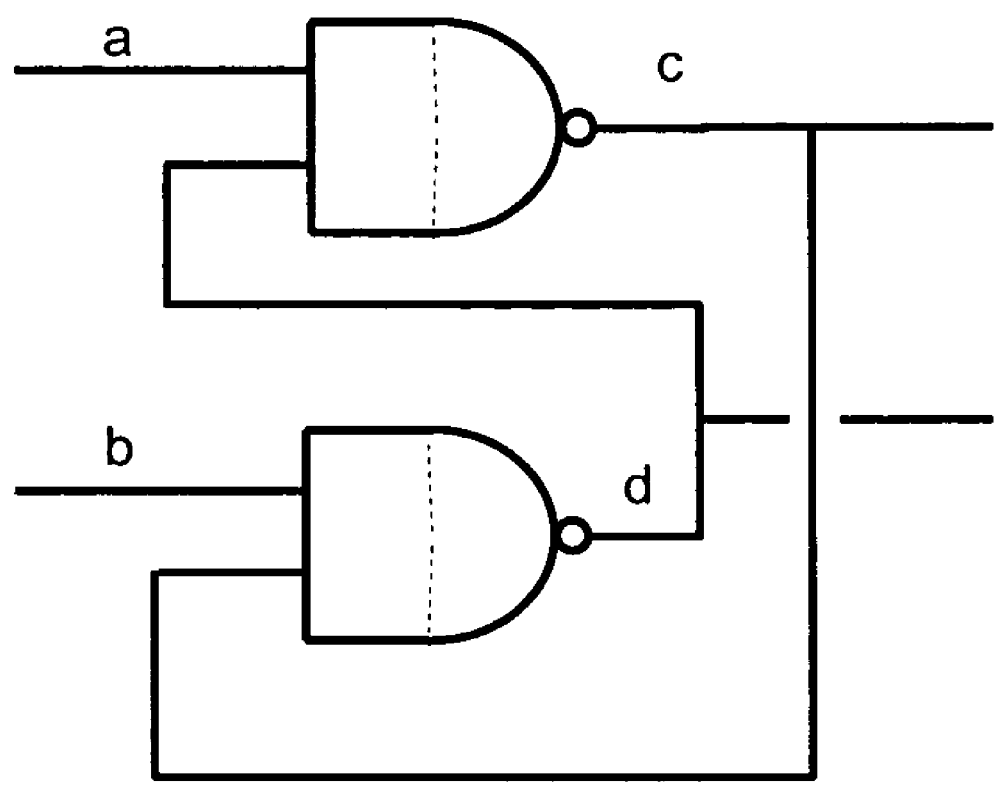
FIG. 20 shows the known diagram of a static latch from NAND functions.
Figure 21:
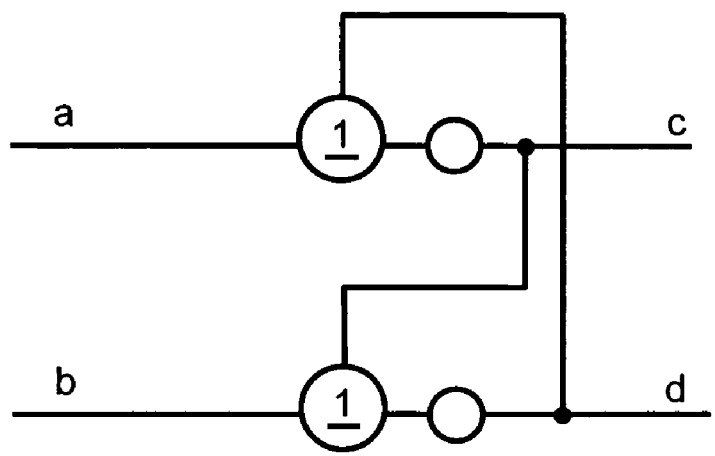
FIG. 21 shows a realization of a NAND latch by individually controlled gates with inverters.
Figure 22:
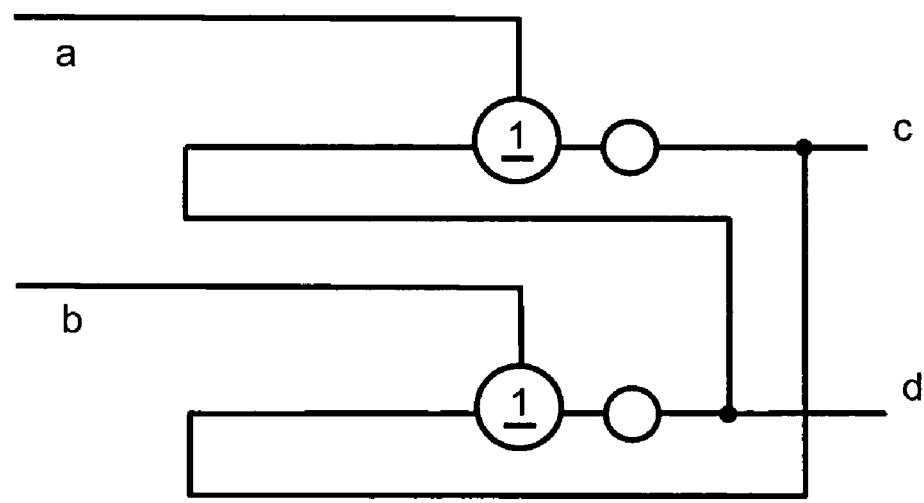
FIG. 22 shows another realization of a NAND latch by individually controlled gates with inverters.

FIG. 20 shows the known symbolic representation of the NAND based latch. FIG. 21 shows the realization of the latch with the NAND circuits as explained before and shown in FIG. 19. Because the NAND circuits are commutative it does not matter what the order of the signals is. FIG. 22 shows the modified version of FIG. 21, wherein the external signals are not provided on the inputs to the gate but on the control inputs. Analysis of the signal flow will confirm that the diagram of FIG. 22 will also realize a NAND latch, thus demonstrating the commutative nature.

Realizing Non-commutative Binary Functions with Individually Controlled Gates

The realization of the non-commutative binary logic function will not provide input symmetry. In fact switching the order of inputs will create a different solution. Or conversely realizing a binary non-commutative logic function after switching the inputs will require different components. This is shown with non-commutative function B2 as an example. The truth table of binary logic function B2 is shown in FIG. 23. It is assumed that the columns are representative of an input 'a' and the rows of an input 'b'. One can say that when 'a=0' 'b' sees an inverter or column (0 1). The inverter (0 1) is the identity inverter. The identity inverter is a conductor. When 'a=0' the input 'b' sees an inverter or column (0 0). The inverter (0 0) represents a non-conducting interruption when a '0' represents the 'absence of signal'. Consequently 'b' sees either a conductor or an interruption. The solution is shown in FIG. 24, wherein a single individually controlled gate that is conducting for 'a=0' ('a' is the control signal) and with 'b' is the input signal, realizes the truth table.

When inputs 'a' and 'b' are switched in position the situation changes. When 'b=0' then input 'a' 'sees' an inverter (0 0). When 'b=1' then 'a' sees an inverter (1 0). The diagram of FIG. 25 (note that the position of 'a' and 'b' are exchanged) also realizes the truth table of FIG. 23. The circuit comprises an inverter and an individually controlled gate which is conducting when the control signal is 1.

The latch based on the binary non-commutative logic function B2 realized with individually controlled gates was already shown in diagram in FIG. 14 and FIG. 15.

There are different ways to realize the functional diagrams. One aspect of the present invention is to provide an electronic technology based embodiment, based on what is known as transmission gates in CMOS technology.

Another embodiment of the latch is in optical form. In such an embodiment for example the presence and the absence of an optical signal represent the two binary logic states. In such an optical switch the passing and stopping of an optical signal can be controlled by an optical control signal. The technology for such individually controlled optical switches is known, and for instance apply the known Kerr effect. Such an optical switch is for example enabled and described in Y. -D. Wu, "New all-optical switch based on the spatial soliton repulsion," Opt. Express 14, 4005-4012 (2006) which is incorporated herein by reference. In yet another embodiment a measure of rotation of the plane of polarization of an electromagnetic or optical signal can be used to signify a different logic state, which can be used in both the information signal and the control signal. In yet another embodiment a hybrid of electro-optical components can be used to create an electro-optical embodiment. For instance a light sensor can be used at the input of the individually controlled switch and at the input of the control input. The individually controlled switch can be an electronic individually controlled switch. The output of the individually controlled switch can then be connected to an optical source such as a laser or a L.E.D. which is switched on or off by the output signal of the individually controlled electronic switch. The difference between an electro-optical embodiment and an electrical embodiment of the memory latches here provided is that the optical signals from the output will be used in feed-back to the optical control inputs, while in an electrical embodiment the electrical output signals will be used. Other configurations in electro-optical, optical and electrical embodiments are possible and fully contemplated.

Switched Solutions

The sequential logic solutions here provided as an aspect of the present invention can be realized for instance in electronic form, in optical form and also in electro-optical form among others. The selected solution greatly depends on the required cost and performance. For instance in electronic form one can realize an individually controlled gate as an n-type or a p-type switch, having it perform better for instance in conducting or non-conducting mode.

Figure 26:
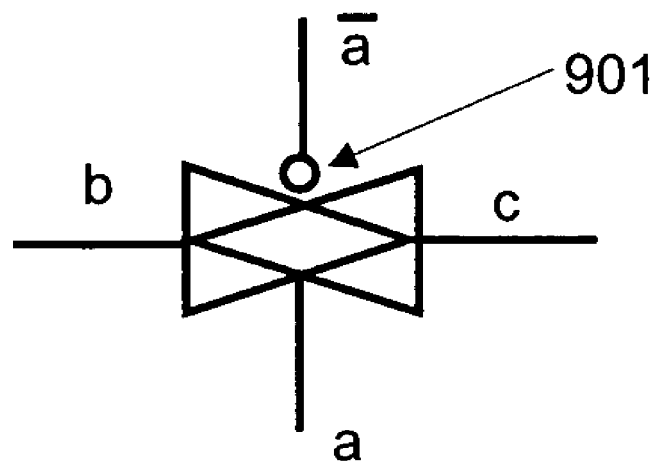
FIG. 26 shows a diagram of a transmission gate.

As an illustrative example a solution with a CMOS transmission gate will be provided. Transmission gates are known technology and comprise a combination of n-type and p-type switches. Transmission gates perform well both in conducting and non-conducting mode. However as an individually controlled gate they also require the inverted control signal and thus an inverter for each control signal. The symbol for such a gate is shown in FIG. 26. The transmission gate is an individually controlled gate. It has a signal input 'b' and a signal output 'c'. A control signal is provided on 'a' and its inverted value on '$\bar{a}$' by using the inverter 901 as shown in FIG. 26.

Figure 27:
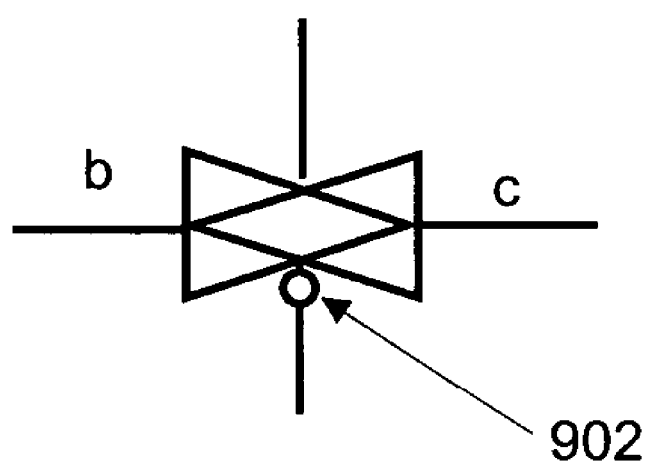
FIG. 27 shows another configuration of a transmission gate.

FIG. 27 shows the presentation of the transmission gate as an individually controlled gate which is conducting for 'a=0' and consequently for '$\bar{a}$=1' when '$\bar{a}$' is the inverted value of 'a'. In that case the input signal on 'b' is identical to the output signal on 'c'. When 'absence of signal' represents state 0, then when the gate is non-conducting the output signal on 'c' represents the state 0. By putting the inverter in the path of the bottom control signal as shown for inverter 902 in FIG. 27 one changes the transmission gate into conducting mode when the control signal represents state 0 and its inverted value represents the state 1. Accordingly the diagram of FIG. 27 executes the binary logic function B2 with truth table

| B2 | 0 | 1 |
|---|---|---|
| 0 | 0 | 0 |
| 1 | 1 | 0 |

Figure 28:
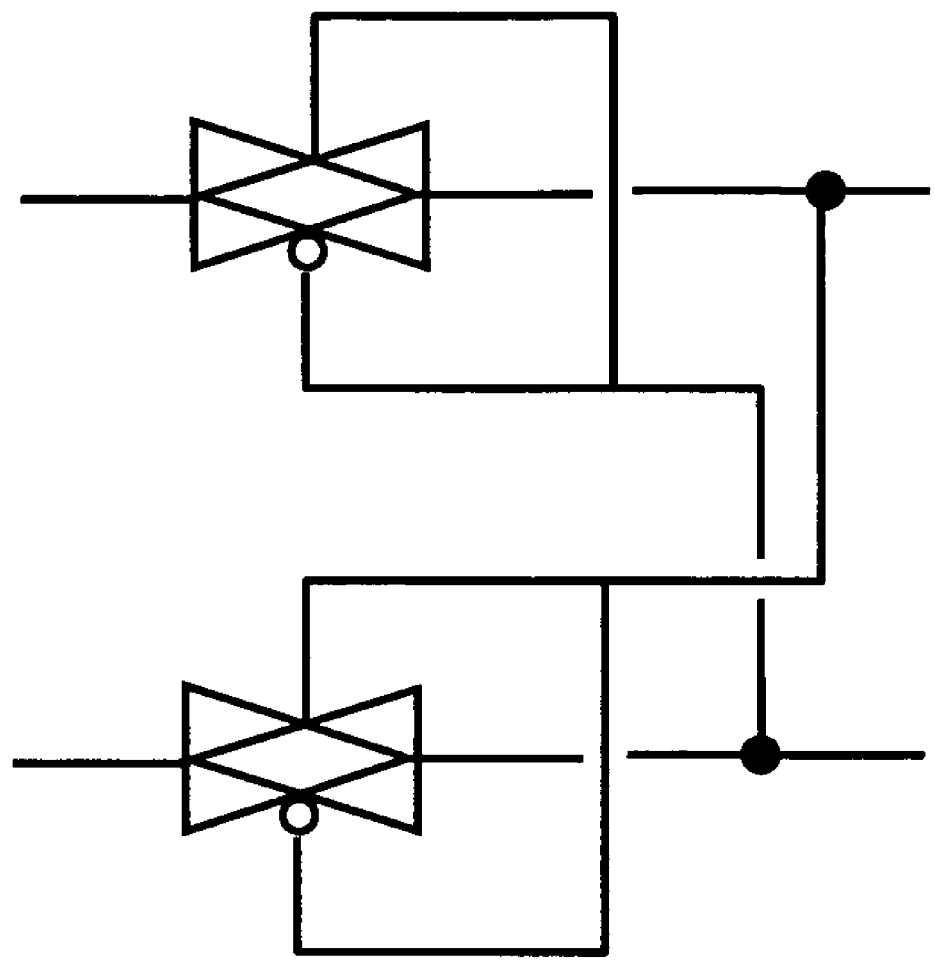
FIG. 28 shows a diagram of a static latch using transmission gates and two inverters.

The diagram of FIG. 28 then shows the binary latch made from 2 functions B2 with feedback as shown in FIG. 14 but now realized with 2 transmission gates and including two inverters.

Figure 29:
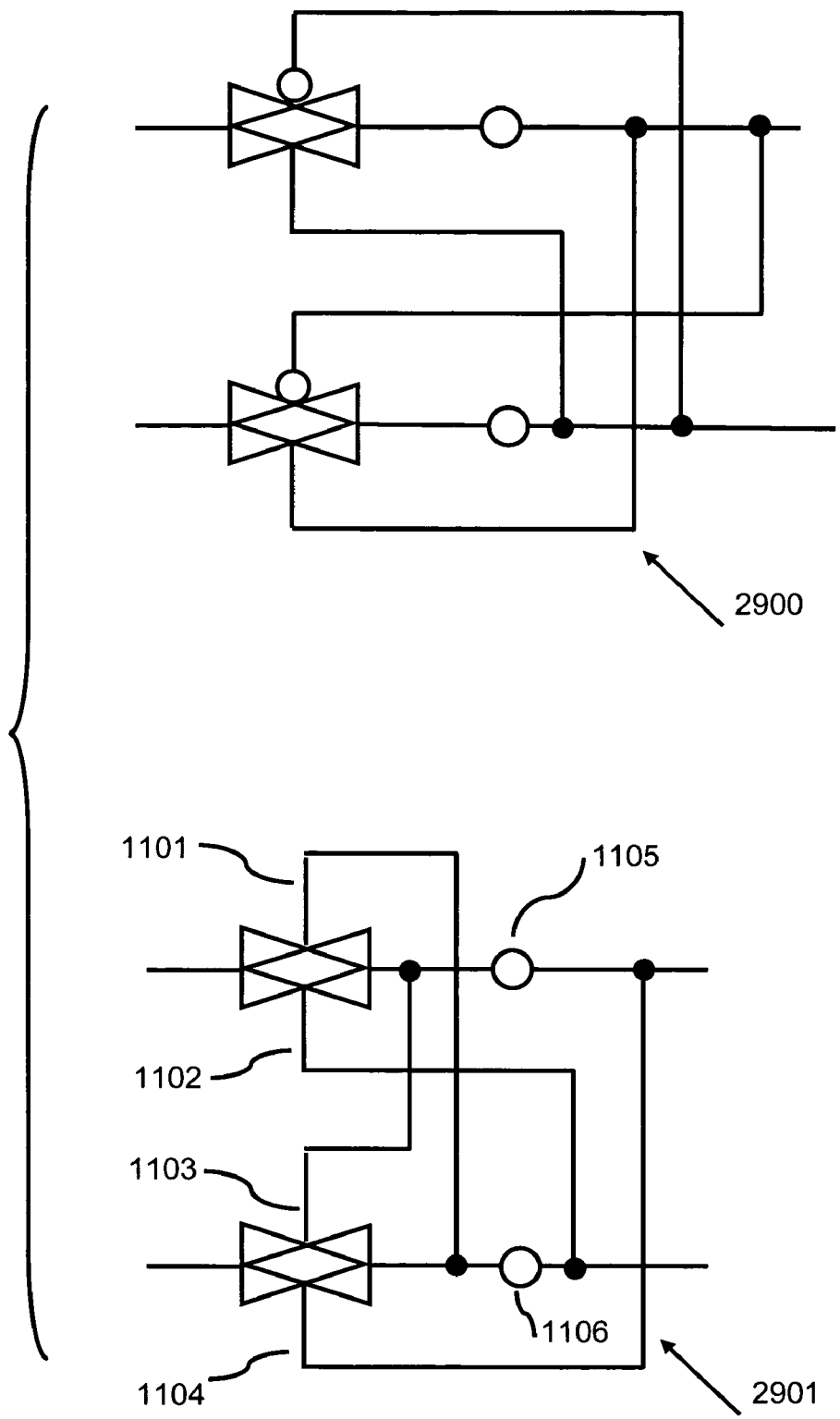
FIG. 29 shows other configurations of a static latch using transmission gates and inverters.

A switching diagram of two functions with feedback, combined with realizing the latches with individually controlled gates with inverters provides a new insight into how latches can be realized, for instance with transmission gates. It has been shown that the realization of the latch from binary functions B2 requires two transmission gates and two inverters to generate inverted control signals, as shown in FIG. 28. Now referring to FIG. 21 where it has been shown that the known latch made from NAND functions requires two inverters and two individually controlled gates which are conducting for the control signal having state 1. This means that an inverted ('behind' the inverter) and a non-inverted ('in front' of the inverter) version of the same signal are available. This allows the NAND based latch to be realized with transmission gates and inverters as shown in FIG. 29. FIG. 29 shows in 2900 the unreduced configuration. However in 2901 one can save using additional inverters. Herein the signals on 1101 and 1102 are inverted versions of each other because of inverter 1106. The signals on 1103 and 1104 are inverted versions of each other because of inverter 1105. Inverters 1105 and 1106 already have to be used to realize the NAND function and so their presence can be used to provide the appropriate inverted control signals "for free".

Figures 30, 31:
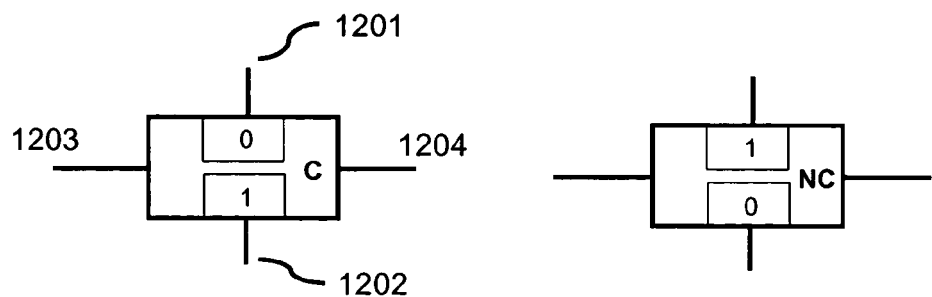
FIG. 30 shows a diagram of a gate.
FIG. 31 shows another diagram of a gate.
Figure 32:
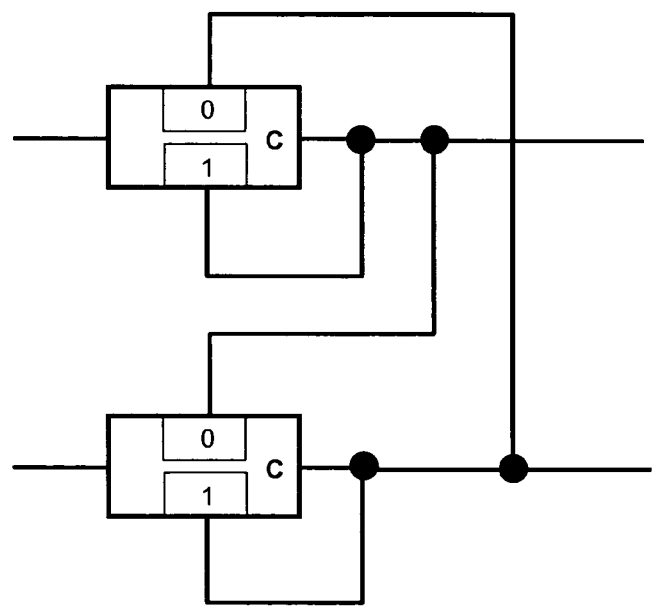
FIG. 32 shows a diagram of a static latch.

Another aspect of the present invention is to realize a latch with transmission gates without using inverters. It is known that a CMOS transmission gate conducts either well or does 'stops' well for control inputs (0,1) and control inputs (1,0)

wherein a combination (0,1) or (1,0) usually consists of a control signal and its inverted value. The situations (0,0) and (1,1) are generally not used because in those cases the CMOS transmission gate is a 'weak conductor' for an input signal. FIG. 30 shows a representation of a transmission gate, for a conducting situation. The input 1203 and output 1204 are connected in a conducting way when control input 1201 has a state 0 and 1202 has state 1. FIG. 31 shows the Non-conducting state for the transmission gate. A latch can be created by the configuration of FIG. 32. From the related configuration of FIG. 14 and the switching table of binary function B2 it should be apparent that this latch works for inputs (0,1), (1,0) and (1,1). The weak conductance may influence the speed with which the switch will follow the change in input signals.

Figure 33:
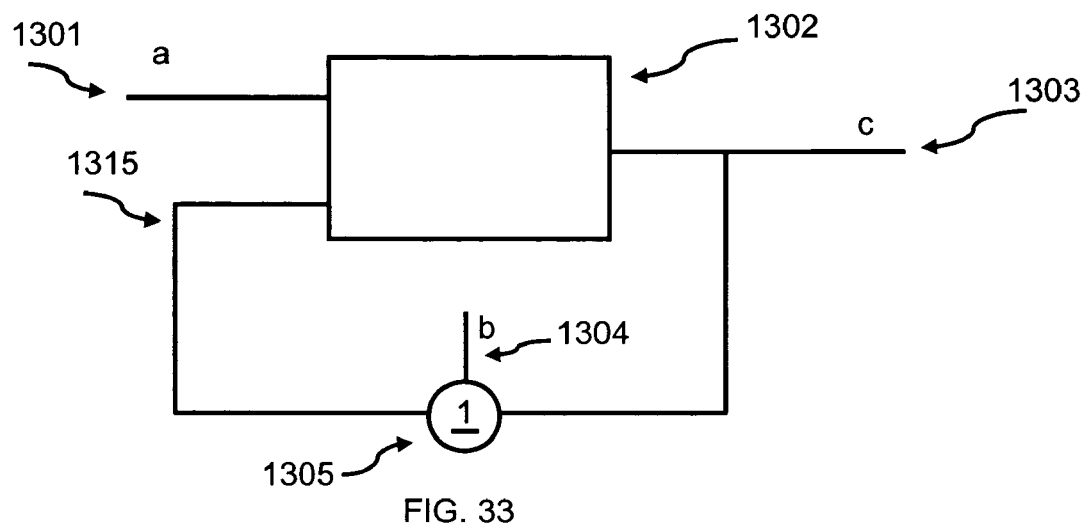
FIG. 33 shows another diagram of a static latch.

Another aspect of the present invention is to create a latch by way of a single binary device with feedback with an individually controlled gate in the feedback loop. The configuration of this latch is shown in FIG. 33. It has an input 1301 which provides a binary signal 'a'. The device 1302 executes a binary logic function and provides a signal 'c' on output 1303. The signal on 1303 is fed back to a second input 1315 of device 1302. By applying the binary switching model (though using just one expression) one can find the two binary functions FB1 and FB2 that enable this configuration as a latch. The truth tables of FB1 and FB2 are provided in the following truth tables.

| FB1 | 0 | 1 | FB2 | 0 | 1 |
|-----|---|---|-----|---|---|
| 0   | 0 | 1 | 0   | 1 | 1 |
| 1   | 1 | 1 | 1   | 0 | 1 |

Figure 34:
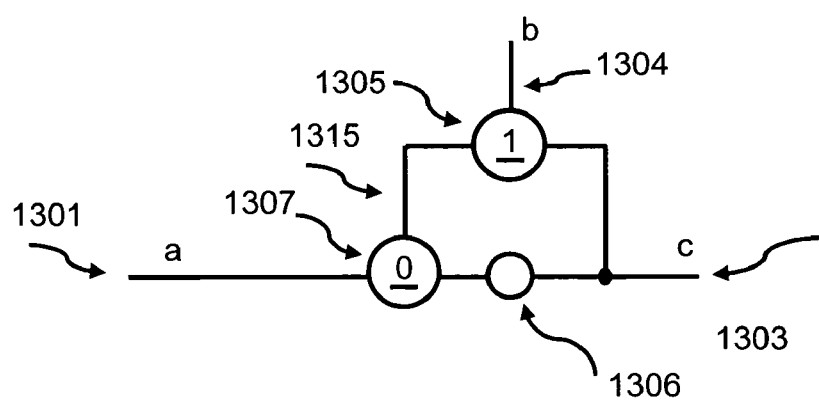
FIG. 34 shows another diagram of a static latch.

The numerals that are identical in FIG. 33 and FIG. 34 represent identical input and output signals and gates. FIG. 33 and FIG. 34 provide another illustrative example of how the switching model can be applied to create latch configurations.

In view of the above description of the present invention, it will be appreciated by those skilled in the art that many variations, modifications and changes can be made to the present invention without departing from the spirit or scope of the present invention as defined by the claims appended hereto. All such variations, modifications or changes are fully contemplated by the present invention. While the invention has been described with reference to an illustrative embodiment, this description is not intended to be construed in a limiting sense.

It is also understood that the application of the present invention is focused on creating stable output signals as a result of applied logic functions. It should be clear to those skilled in the art that the conditions and requirements can be changed in such a way that the circuits of the present invention will never become stable and may therefore have a useful application as a signal generator or multi-vibrator.

It is further understood that "absence of signal" can also represent the logic state 1 and "presence of signal" can represent the state 0. The here provided switching embodiments can be adjusted to such states accordingly.

It is further understood that the binary states 0 and 1 do not actually mean 'on' or 'off' states. A state can be represented by any signal, even absence of signal, as long as the state 0 and the state 1 are represented by signals that are different in one or more aspects.

The following patent applications, including the specifications, claims and drawings, are hereby incorporated by reference herein, as if they were fully set forth herein: (1) U.S. Provisional Patent Application No. 60/575,948, filed on Jun. 1, 2004, entitled MULTI-VALUE CODING OF SEQUENCES AND MULTI-VALUE MEMORY DEVICES; (2) U.S. Provisional Patent Application No. 60/599,781, filed Aug. 7, 2004, entitled MULTI-VALUED DIGITAL INFORMATION RETAINING ELEMENTS AND MEMORY DEVICES. (3) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (4) U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (5) U.S. Provisional Patent Application No. 60/646,700 filed Jan. 25, 2005, entitled MULTI-VALUED LOGIC FUNCTIONS IN LOOK-UP TABLE AND MEMORY CONFIGURATIONS; (6) U.S. Non-Provisional patent application Ser. No. 11/139,835 filed May 27, 2005, entitled MULTI-VALUED DIGITAL INFORMATION RETAINING ELEMENTS AND MEMORY DEVICES.

What is claimed is:

1. A binary memory latch, comprising:
a circuit having a first and a second input and an output implementing a logical structure which is completely determined by a combination of a first and a second binary logic function, each binary logic function being determined by a truth table, wherein
each binary logic function in the combination having a first input and a second input and an output of which a state is completely determined by a state of the first input and a state of the second input;
the output of the first logic function is connected to the second input of the second logic function and the output of the second logic function is connected to the second input of the first logic function; and
at least one of the first and the second binary logic function is determined by a truth table selected from the group consisting of:
a first truth table wherein X represents a state of the first input, Y represents a state of the second input and OUT represents a state of the output of a binary logic function as provided by the following table:

| X | Y | OUT |
|---|---|-----|
| 0 | 0 | 0   |
| 0 | 1 | 0   |
| 1 | 0 | 1   |
| 1 | 1 | 0;  | a second truth table wherein X represents a state of the first input, Y represents a state of the second input and OUT represents a state of the output of a binary logic function as provided by the following table:

| X | Y | OUT |
|---|---|-----|
| 0 | 0 | 1   |
| 0 | 1 | 0   |

-continued

| X | Y | OUT |
|---|---|---|
| 1 | 0 | 1 |
| 1 | 1 | 1; | a third truth table wherein X represents a state of the first input, Y represents a state of the second input and OUT represents a state of the output of a binary logic function as provided by the following table:

| X | Y | OUT |
|---|---|---|
| 0 | 0 | 1 |
| 0 | 1 | 1 |
| 1 | 0 | 0 |
| 1 | 1 | 1; | and
a fourth truth table wherein X represents a state of the first input, Y represents a state of the second input and OUT represents a state of the output of a binary logic function as provided by the following table:

| X | Y | OUT |
|---|---|---|
| 0 | 0 | 0 |
| 0 | 1 | 1 |
| 1 | 0 | 0 |
| 1 | 1 | ;0 | and wherein
the first input of the circuit is the first input of the first logic function;
the second input of the circuit is the first input of the second logic function; and
the output of the circuit is enabled to provide a binary signal, the output of the circuit being equivalent to either the output of the first logic function or the output of the second function.

2. The latch as claimed in claim 1, wherein the first and the second logic function both are determined by the first truth table.

3. The latch as claimed in claim 1, wherein the first and the second logic function both are determined by the third truth table.

4. The latch as claimed in claim 1, wherein the first logic function is determined by the first truth table and the second logic function is the binary NOR function.

5. The latch as claimed in claim 1, wherein the first logic function is the binary NAND function; and the second logic function is determined by the second truth table.

6. The latch as claimed in claim 1, wherein the first logic function is determined by the third truth table and the second logic function is determined by the fourth truth table.

7. The latch as claimed in claim 1, wherein the first logic function is the binary AND function and the second logic function is determined by the third truth table.

8. The latch as claimed in claim 1, wherein the first logic function is the binary NAND function and the second logic function is determined by the second truth table.

9. The latch as claimed in claim 1, wherein the first logic function is determined by the fourth truth table and the second logic function is the binary OR function.

10. A binary memory latch comprising:
a first individually controlled gate with an input, an output and a control input wherein a signal representing a binary logic state provided on the input will be provided on the output when a control signal provided on the control input represents the logic state 0, and a signal representing the logic state 0 will be provided on the output when a control signal representing the logic state 1 is provided on the control input; a second individually controlled gate functionally identical to the first individually controlled gate with an input an output and a control input; the output of the first individually controlled gate being connected to the control input of the second individually controlled gate; and the output of the second individually controlled gate being connected to the control input of the first individually controlled gate.

11. The latch as claimed in claim 10, wherein all the signals are optical signals.

12. The latch as claimed in claim 10, wherein all the signals are electrical signals.

13. The latch as claimed in claim 10, wherein the signals provided on the inputs, the control inputs and the outputs are optical signals.

14. A binary memory latch, comprising:
a first transmission gate with an input, an output, a first type control input and a second type control input;
the first transmission gate being turned off when the first type control input is at a first binary state and the second type control input is at a second binary state;
the first transmission gate being turned on when the first type control input is at a second binary state and the second type control input is at a first binary state;
a second transmission gate having an input, an output, a first type control input and a second type control input and being functionally identical to the first transmission gate; the first type control input of the first transmission gate being connected to the output of the first transmission gate and the second type control input of the first transmission gate being connected to the output of the second transmission gate; and
the first type control input of the second transmission gate being connected to the output of the second transmission gate and the second type control input of the second transmission gate being connected to the output of the first transmission gate.

15. The binary memory latch as claimed in claim 14 wherein the first type control input is an n-type control input and the second type control input is a p-type control input.

16. The binary memory latch as claimed in claim 15 wherein the first binary state is 0 and the second binary state is 1.

17. The binary memory latch as claimed in claim 14 wherein a turned off gate is non-conducting and a turned on gate is conducting.

18. The latch as claimed in claim 1, wherein the circuit is implemented by using an individually controlled switch having an input, a control input and an output, each able to be in one of two states, and wherein:
the output assumes a state of the input whenever the control input is in a first of two states; and
the output assumes a state corresponding with an absence of signal whenever the control input is not in a first of two states.

19. A binary memory latch, comprising:
  a circuit having a first and a second input and an output implementing a logical structure which is completely determined by a combination of a first and a second binary logic function, wherein:
    each binary logic function in the combination having a first input and a second input and an output of which a state is determined only by a state of the first input and a state of the second input;
    the output of the first logic function is connected to the second input of the second logic function and the output of the second logic function is connected to the second input of the first logic function; and
    the first logic function is the binary OR functions and second logic function is the binary AND function; and wherein
  the first input of the circuit is enabled to receive a binary signal, the first input of the circuit being equivalent to the first input of the first logic function;
  the second input of the circuit is enabled to receive a binary signal, the second input of the circuit being equivalent to the first input of the second logic function; and
  the output of the circuit enabled to provide a binary signal the output being equivalent to either the output of the first logic function or the output of the second function.

20. A binary memory latch, comprising:
  a circuit having a first and a second input and an output implementing a logical structure which is completely determined by a combination of a first and a second binary logic function, wherein:
    each binary logic function in the combination having a first input and a second input and an output of which a state is determined only by a state of the first input and a state of the second input;
    the output of the first logic function is connected to the second input of the second logic function and the output of the second logic function is connected to the second input of the first logic function; and
    the first logic function and the second logic function are both determined by a truth table wherein X represents a state of the first input, Y represents a state of the second input and OUT represents the state of the output of a binary logic function as provided by the following table:

| X | Y | OUT |
|---|---|-----|
| 0 | 0 | 0 |
| 0 | 1 | 0 |
| 1 | 0 | 1 |
| 1 | 1 | 0; | and
  the first input of the circuit is enabled to receive a binary signal, the first input of the circuit being equivalent to the first input of the first logic function;
  the second input of the circuit is enabled to receive a binary signal, the second input of the circuit being equivalent to the first input of the second logic function; and
  the output of the circuit enabled to provide a binary signal the output being equivalent to either the output of the first logic function or the output of the second function.

* * * * *